Figure 1:
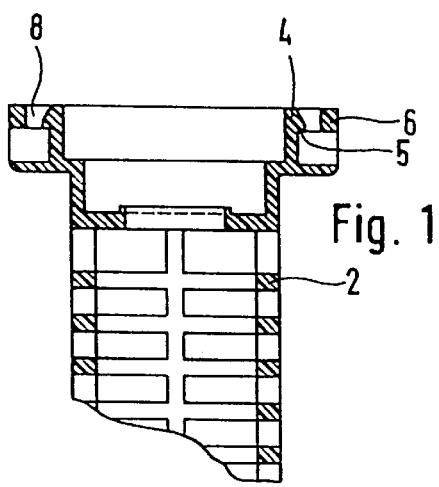

United States Patent

Brieden et al.

[11] Patent Number: 5,956,822
[45] Date of Patent: Sep. 28, 1999

[54] SNAP-LOCK CONNECTION FOR TWO PARTS WHICH CAN ROTATE IN RELATION TO EACH OTHER

[75] Inventors: Thomas Brieden, Waiblingen; Rolf Möhle, Bretzfeld; Abdul-Bashir Sarwar, Stuttgart, all of Germany

[73] Assignee: Knecht Filterwerke GmbH, Stuttgart, Germany

[21] Appl. No.: 09/171,724

[22] PCT Filed: Jun. 6, 1997

[86] PCT No.: PCT/DE97/01135

§ 371 Date: Oct. 23, 1998

§ 102(e) Date: Oct. 23, 1998

[87] PCT Pub. No.: WO97/47891

PCT Pub. Date: Dec. 18, 1997

[30] Foreign Application Priority Data

Jun. 12, 1996 [WO] WIPO ............... PCT/DE96/01027
Dec. 28, 1996 [DE] Germany ............... 196 54 667

[51] Int. Cl.⁶ ............... A44B 17/00; F16B 37/00
[52] U.S. Cl. ............... 24/662; 24/590; 24/663
[58] Field of Search ............... 24/662, 663, 590, 24/683, 324, 116 A

[56] References Cited

U.S. PATENT DOCUMENTS

| | | | |
|---|---|---|---|
| 1,265,719 | 5/1918 | Anderson | 24/662 |
| 4,400,856 | 8/1983 | Tseng | 24/590 |
| 4,728,236 | 3/1988 | Kraus | 24/662 |
| 4,859,129 | 8/1989 | Kraus | 24/662 |
| 4,985,968 | 1/1991 | Hooper | 24/662 |

FOREIGN PATENT DOCUMENTS

| | | | |
|---|---|---|---|
| 0268500 | 10/1963 | Australia | 24/662 |
| 0 723 796 | 7/1996 | European Pat. Off. | |
| 94 08 546 | 9/1994 | Germany | |
| 195 12 327 | 8/1996 | Germany | |
| 0016365 | of 1911 | United Kingdom | 24/662 |

Primary Examiner—Victor N. Sakran
Attorney, Agent, or Firm—Collard & Roe, P.C.

[57] ABSTRACT

A snap-lock connection for two parts (1, 2) which canrotate in relation to each other has radially resilient locking hooks (3) arranged in a ring, supported on the ring-shaped edge of a matching body and secured against unlocking in the radial direction by a fixing ring (6). The fixing ring (6) and/or the body that form the ring-shaped edge (5) are designed as a ring which is secured to one of the parts (1, 2) exclusively by individual webs (7) spaced apart around its circumference.

2 Claims, 1 Drawing Sheet

SNAP-LOCK CONNECTION FOR TWO PARTS WHICH CAN ROTATE IN RELATION TO EACH OTHER

Two parts which can be latched to one another The invention relates to two parts which can be latched to one another and, in the latched state, can be rotated with respect to one another.

EP, which was not published before the priority date of this application, 0 723 796 A1 describes a device in which radially resilient latching hooks are arranged in the form of a ring on one of the two parts, an annular flank is provided in each case on the other of the two parts for supporting the latching hooks in the axial direction, the latched-in latching hooks are secured by a fixing ring, which is aligned concentrically with respect to the arrangement of the latching hooks, against being inadvertently released from their latched-in position, the fixing ring and/or the body which forms the annular flank is or are elastically deformable in the radial direction and the width of the annular gap between the fixing ring and the radial latching hook abutment surface of the annular flank is smaller than the radial width of the latching hooks.

This problem is solved by a design comprising two parts which can be latched to one another and, in the latched state, can be rotated with respect to one another, having all the features of Patent claim 3.

The invention is based on the idea of designing as, in theory, a free-floating ring those material regions which are to open out upon closure of the latching connection, the smallest possible number of thin webs attaching each ring axially to one of the two parts which are to be connected.

A particularly advantageous embodiment forms the subject matter of claim 4.

Figure 4:
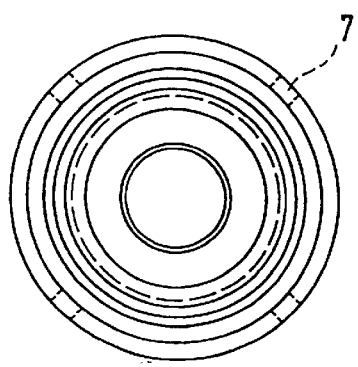
Figure 2:
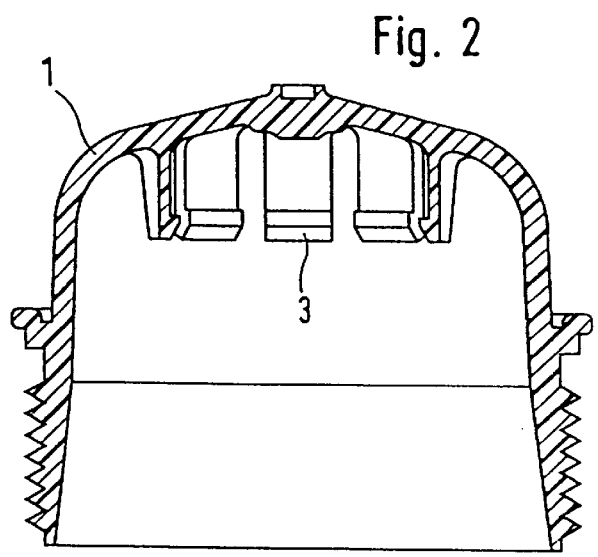
Figure 3:
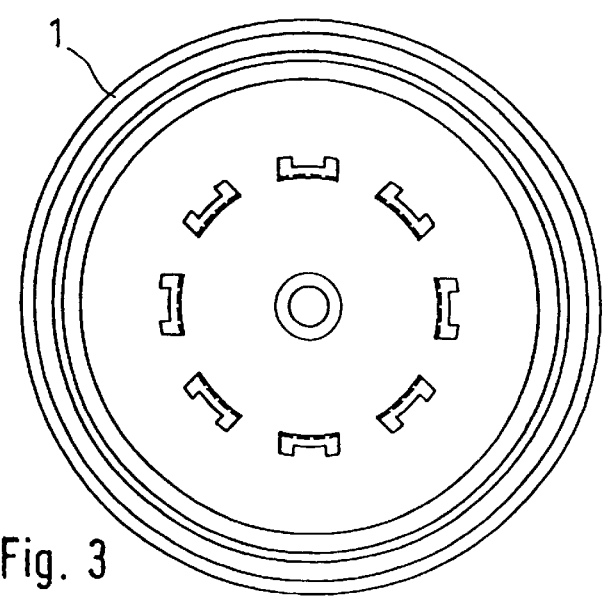

An exemplary embodiment is illustrated in the drawing, in which:

FIG. 1 shows a longitudinal section through one end of a tubular frame for receiving an annular filter element in a releasable manner, FIG. 2 shows a longitudinal section through a cover of a filter housing with latching hooks for the releasable connection to the tubular frame according to FIG. 1, FIG. 3 shows a plan view of the cover according to FIG. 2, and FIG. 4 shows a plan view of that end of the tubular frame of a filter element which is illustrated in FIG. 1.

The exemplary embodiment illustrated relates to a latching connection between a screw-action cover 1 of a liquid filter and a tubular frame 2 onto which an annular filter element can be pushed in a releasable manner, it being possible for said two parts of the latching connection to be rotated with respect to one another.

Axially projecting, radially resilient latching hooks 3 are provided, in an annular arrangement, in the closed base of the screw-action cover. These latching hooks 3 can be snapped into a receiving device provided on the tubular frame 2.

The receiving device on the tubular frame 1 (sic) comprises a continuous, radially inner annular collar 4 with an annular flank 5 as axial stop surface for the latching hooks 3.

A fixing ring 6 is provided, coaxially with the annular collar 4, on the tubular frame 2 and is connected to the latter via individual axial webs 7 which are distributed over the circumference.

The width of the annular gap 8 between the fixing ring 6 and the annular collar 4 is smaller than the radial width of the latching hooks 3 at the latching end of the latter. When the latching connection is brought into engagement, the latching hooks 3 thus open out the annular gap locally in each case until the latching hooks 3 can engage in their latched-in position. The annular gap 7 (sic) is caused to open out locally around the circumference primarily by the fixing ring 6 opening out elastically in the radial direction in the circumferential regions upon which the latching hooks 3 act in each case. Since the fixing ring is connected to the basic body of the tubular frame 2 simply via a small number of individual, relatively thin axial webs 7, the necessary opening-out action takes place relatively easily, even if the fixing ring 3 (sic) is made of a relatively rigid material, by virtue of elastic deformation of the fixing ring 6. For the opening-out action, the fixing ring 6 can deform in a non-circular manner by those regions which the latching hooks 3 act upon directly yielding radially outwards to a further extent than the regions between these locations, which regions can contract radially inwards.

The inventive design of the receiving device provided for receiving the latching hooks 3 on the tubular frame 2 is suitable, in a particularly advantageous manner, for production as a plastic molding.

We claim:

1. Two parts (1, 2) which can be latched to one another and, in the latched sate, can be rotated with respect to one another, the parts having radially resilient latching hooks, which are arranged in the form of a ring, on one of the two parts (1 or 2) and an annular flank (5), for supporting the latching hooks (3) in the axial direction, on the other part (2 or 1), in which latching connection the latched-in latching hooks (3) are secured by a fixing ring (6), which is aligned concentrically with respect to the arrangement of the latching hooks (3), against undesired release from their latched-in position, and the fixing ring (6) and the body which forms the annular flank (5) are elastically deformable in the radial direction, and in which latching connection, furthermore, the width of an annular gap (8) between the fixing ring (6) and a radial latching-hook abutment surface of the annular flank (5) is smaller than a radial width of the latching hooks (3), wherein the fixing ring (6) and the body which forms the annular flank (5) are each designed as a ring which is fastened in each case, on one of the parts (1 and 2) which is to be connected, via individual webs (7) which are spaced apart over the circumference.

2. Two parts which can be latched to one another and, in the latched state, can be rotated with respect to one another, according to claim 1, wherein, in the latched state, the latching hooks (3) butt against the annular flank (5) of the mating body with radially inward resilient action, and the mating body has greater radial rigidity than the fixing ring (6).

* * * * *